United States Patent
Lewis et al.

(10) Patent No.: US 10,900,318 B2
(45) Date of Patent: Jan. 26, 2021

(54) PRESSURE-EXCHANGER TO ACHIEVE RAPID CHANGES IN PROPPANT CONCENTRATION

(71) Applicant: HALLIBURTON ENERGY SERVICES, INC., Houston, TX (US)

(72) Inventors: Bryan John Lewis, Duncan, OK (US); Stanley V. Stephenson, Duncan, OK (US); Philip D. Nguyen, Houston, TX (US); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/078,617

(22) PCT Filed: Apr. 7, 2016

(86) PCT No.: PCT/US2016/026380
§ 371 (c)(1),
(2) Date: Aug. 21, 2018

(87) PCT Pub. No.: WO2017/176268
PCT Pub. Date: Oct. 12, 2017

(65) Prior Publication Data
US 2019/0055805 A1 Feb. 21, 2019

(51) Int. Cl.
*E21B 33/068* (2006.01)
*E21B 43/267* (2006.01)
*C09K 8/80* (2006.01)

(52) U.S. Cl.
CPC ............ *E21B 33/068* (2013.01); *C09K 8/80* (2013.01); *E21B 43/267* (2013.01)

(58) Field of Classification Search
CPC ........ E21B 33/068; E21B 43/267; C09K 8/80
See application file for complete search history.

(56) References Cited

U.S. PATENT DOCUMENTS 3,431,747 A * 3/1969 Hashemi ................ B01D 61/06
417/339
3,650,628 A  3/1972 Tawfik et al.
(Continued)

FOREIGN PATENT DOCUMENTS

WO  2015157728 A1  10/2015

OTHER PUBLICATIONS

Cao, Zheng, et al. "Integration of CFD and RTD analysis in flow pattern and mixing behavior of rotary pressure exchanger with extended angle." Desalination and Water Treatment (2015): 1-11.
(Continued)

*Primary Examiner* — Aaron L Lembo
(74) *Attorney, Agent, or Firm* — McGuireWoods LLP (57) ABSTRACT

A method that includes introducing a first fluid at a first flow rate into a first end of a channel of a hydraulic energy transfer system, introducing a second fluid at a second flow rate into a second end of the channel opposite the first end, wherein the first flow rate is lower than the second flow rate, and operating the hydraulic energy transfer system to output a third fluid comprising the first fluid and a portion of the second fluid and exhibiting a step-change in concentration of the first fluid. The first fluid is proppant slurry introduced at a first pressure, the second fluid is a clean fluid introduced at a second pressure higher than the first pressure, and third fluid is a fracturing fluid exhibiting the step-change in proppant concentration. The hydraulic energy transfer system includes a rotary isobaric pressure exchanger.

15 Claims, 6 Drawing Sheets

(56) References Cited

U.S. PATENT DOCUMENTS

| | | |
|---|---|---|
| 3,662,652 A | 5/1972 | Cole |
| 3,967,542 A | 7/1976 | Hall et al. |
| 6,540,487 B2 | 4/2003 | Polizos et al. |
| 7,201,557 B2 | 4/2007 | Stover |
| 7,306,437 B2 | 12/2007 | Hauge |
| 7,713,033 B2 | 5/2010 | Roach |
| 7,799,221 B1 | 9/2010 | MacHarg |
| 7,815,421 B2 | 10/2010 | Bross et al. |
| 7,997,853 B2 | 8/2011 | Pique et al. |
| 9,091,164 B2 * | 7/2015 | Surjaatmadja ........... E21B 37/06 |
| 10,125,594 B2 * | 11/2018 | Lewis ................... E21B 21/062 |
| 2005/0028979 A1 * | 2/2005 | Brannon .................. C09K 8/62 |
| | | 166/280.2 |
| 2009/0104046 A1 | 4/2009 | Martin et al. |
| 2009/0185917 A1 | 7/2009 | Andrews |
| 2011/0088915 A1 | 4/2011 | Stanojcic et al. |
| 2013/0105157 A1 * | 5/2013 | Barmatov .............. C09K 8/685 |
| | | 166/280.1 |
| 2014/0048143 A1 | 2/2014 | Lehner et al. |
| 2014/0128655 A1 * | 5/2014 | Arluck ...................... C07C 7/11 |
| | | 585/860 |
| 2014/0374093 A1 * | 12/2014 | Nguyen ................ E21B 43/267 |
| | | 166/280.1 |
| 2015/0096739 A1 | 4/2015 | Ghasripoor et al. |
| 2015/0101806 A1 | 4/2015 | Surjaatmadja. |
| 2015/0184492 A1 | 7/2015 | Ghasripoor et al. |
| 2015/0184502 A1 | 7/2015 | Krish et al. |
| 2015/0184678 A1 | 7/2015 | Arluck et al. |
| 2015/0292310 A1 | 10/2015 | Ghasripoor et al. |
| 2016/0062370 A1 | 3/2016 | Gaines-Germain et al. |

OTHER PUBLICATIONS

Yu, Liu, Zhou Yi-Hui, and Bi Ming-Shua. "3D numerical simulation on mixing process in ducts of rotary pressure exchanger." Desalination and Water Treatment 42.1-3 (2012): 269-273.

ISR/WO for PCT/US2016/026380 dated Dec. 26, 2016.

* cited by examiner

PRESSURE-EXCHANGER TO ACHIEVE RAPID CHANGES IN PROPPANT CONCENTRATION

The present application is a U.S. National Phase entry under 35 U.S.C. § 371 of International Application No. PCT/US2016/026380, filed on Apr. 7, 2016, the entirety of which is incorporated herein by reference.

BACKGROUND

To produce hydrocarbons from a subterranean formation, wellbores may be drilled that penetrate hydrocarbon-containing portions of the subterranean formation. The portion of the subterranean formation from which hydrocarbons may be produced is commonly referred to as a "production zone." In some instances, a subterranean formation penetrated by the wellbore may have multiple production zones at various locations along the wellbore.

Generally, after a wellbore has been drilled to a desired depth, completion operations are performed. Such completion operations may include inserting a liner or casing into the wellbore and, at times, cementing the casing or liner into place. Once the wellbore is completed as desired (lined, cased, open hole, or any other known completion), a stimulation operation may be performed to enhance hydrocarbon production into the wellbore. Examples of common stimulation operations include hydraulic fracturing, acidizing, fracture acidizing, and hydrajetting. Stimulation operations are intended to increase the flow of hydrocarbons from the subterranean formation surrounding the wellbore into the wellbore itself so that the hydrocarbons may then be produced up to the wellhead.

One typical formation stimulation operation involves hydraulic fracturing of the formation and placement of a proppant in the resulting formation fractures. Typically, a fracturing fluid comprising a clean fluid and a proppant slurry is mixed at the surface before being pumped downhole in order to induce fractures in the formation of interest. The creation of such fractures will increase the production of hydrocarbons by increasing the flow paths into the wellbore.

Oftentimes well operators attempt to "pillar frack" the formation, which involves cyclically introducing pulses or plugs of proppant into the clean fluid, thereby providing the target production zone with a step-changed fracturing fluid. The step-changed fracturing fluid creates strategically placed proppant pillars within the fractured formation, thereby enhancing conductivity. It is desired for the step-changed fracturing fluid to transition from the clean fluid to a mixture of clean fluid and proppant in an abrupt or sharp step-change. However, conventional methods of mixing the proppant and clean fluid often result in a spreading of the transition between the clean fluid and the proppant and, as a result, fracturing fluid having a gradual transition rather than the desired step-change is obtained.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates generally to systems and methods for creating an abrupt or sharp step-change in proppant concentration in a fracturing fluid and, more particularly, to using a hydraulic energy transfer system to produce fracturing fluid including a step-change in proppant concentration. Examples disclosed herein operate a hydraulic energy transfer system in an imbalanced mode of operation to generate the fracturing fluid.

While the disclosed examples are discussed in terms of rapidly changing concentration of proppant in a fracturing fluid for use in an oil and/or gas well, the same principles and concepts may be equally employed in other applications and industries to rapidly change concentrations of any two dissimilar fluids. For example, the principles and concepts disclosed herein can be used to rapidly change concentration of one or more components in drilling fluids used in drilling applications, lost-circulation material added to drilling fluids, one or more components in cement, etc. These fluids may be multi-phase fluids such as gas/liquid flows, gas/solid particulate flows, liquid/solid particulate flows, gas/liquid/solid particulate flows, or any other multi-phase flow. Moreover, these fluids may be non-Newtonian fluids (e.g., shear thinning fluid), highly viscous fluids, non-Newtonian fluids containing proppant, or highly viscous fluids containing proppant.

As used herein, the term "proppant" or variations thereof refers to mixtures comprising one of more granular solids such as sized sand, resin-coated sand, sintered bauxite beads, metal beads or balls, ceramic particles, glass beads, polymer resin beads, or bio-degradable materials such ground nut shells, and the like. In certain examples, the proportion of biodegradable proppant may be in the range of 5-90%, as designed by the user of the process.

As used herein, the phrase "proppant slurry" or variations thereof refers to a proppant-carrying fluid that is a mixture of a granular solid, such as sand, with desired fluid additives. The proppant slurry may be any mixture capable of suspending and transporting proppant in desired concentrations. For example, the proppant slurry may contain above about 25 pounds of proppant per gallon. In other examples, the proppant slurry may contain up to 27 pounds of granular solid per gallon of fluid. In certain examples, the proppant slurry may also include fluid additives such as viscosity modifiers, thickeners, etc.

In certain examples, the proppant slurry may comprise fluid additives such as a gelling agent that may comprise substantially any of the viscosifying compounds known to function in the desired manner. The gelling agent can comprise, for example, any polysaccharide polymer viscosifying agent such as guar gum, derivatized guars such as hydroxypropylguar, derivatized cellulosics such as hydroxyethylcellulose, derivatives of starch, polyvinyl alcohols, acrylarnides, xanthan gums, and the like. A specific example of a suitable gelling agent is guar, hydroxypropylguar, or carboxymethyl hydroxypropylguar present in an amount of from about 0.2 to about 0.75 weight percent in the fluid.

In certain examples, the proppant slurry may comprise any water-containing fluid that does not adversely react with the subterranean formation or the other fluid constituents. For example, the fluid can comprise an aqueous mineral or organic acid, an aqueous salt solution such as potassium chloride solution, ammonium chloride solution, an aqueous organic quaternary ammonium chloride solution, or the like.

As used herein, the phrase "clean fluid," or variations thereof, refers to a fluid that does not have significant amounts of proppant or other solid materials suspended therein. Clean fluids may include most brines and fresh water. The brines may sometimes contain viscosifying agents or friction reducers. The clean fluid may also include energized fluids such as foamed or comingled brines with carbon dioxide or nitrogen, acid mixtures or oil, based fluids and emulsion fluids.

As used herein, the phrase "fracturing fluid" or variations thereof, refers to a mixture of a clean fluid and a proppant or proppant slurry in any proportion.

Figure 1:
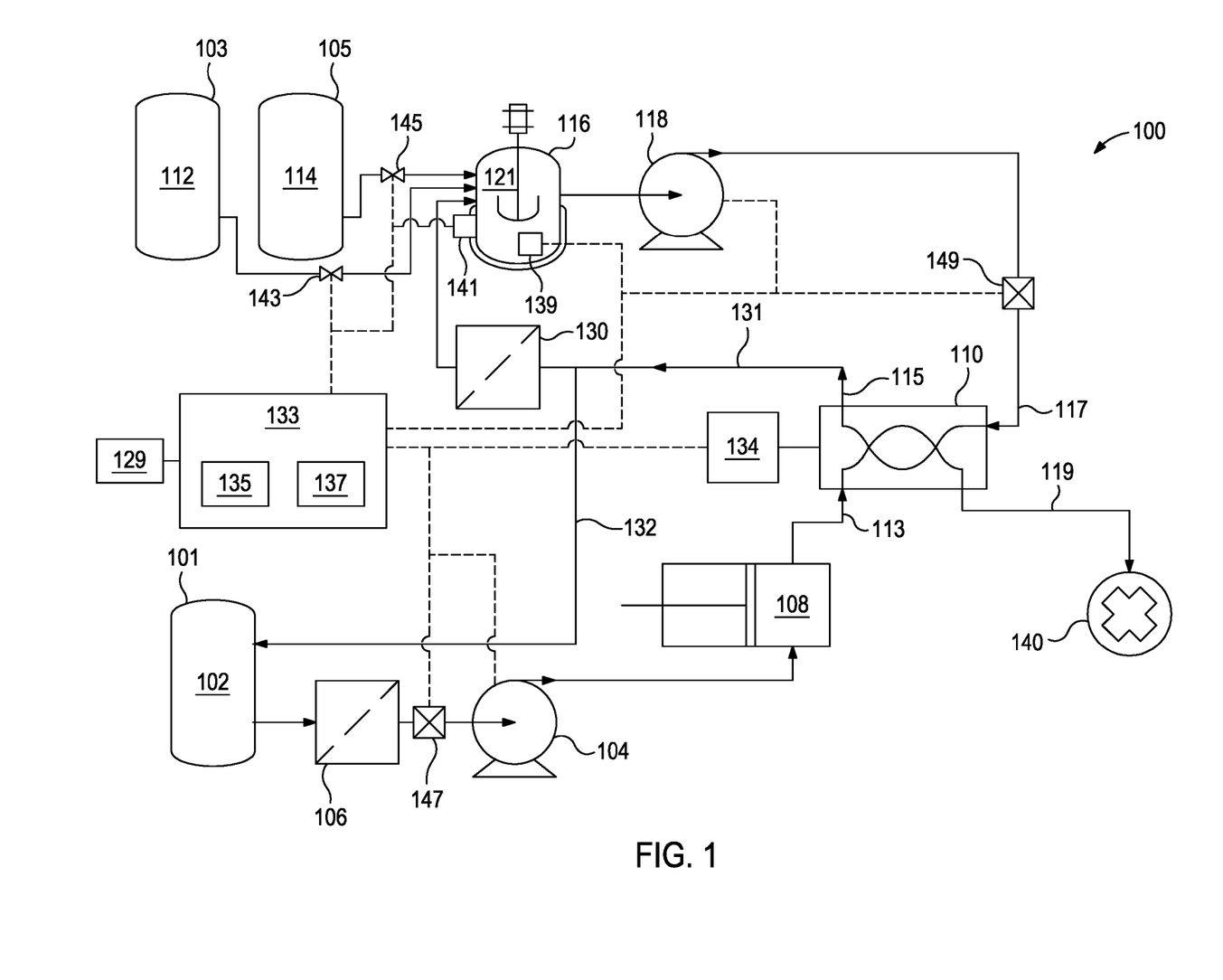
FIG. 1 is a schematic diagram of a fracturing fluid handling system that can incorporate the principles of the present disclosure.

FIG. 1 is a schematic diagram of a fracturing fluid handling system 100 (hereinafter referred to as the "frac system 100") that can incorporate the principles of the present disclosure. The frac system 100 is configured for fracturing wells in low-permeability reservoirs, among other wellbore servicing jobs. In fracturing operations, a wellbore servicing fluid, such as a particle-laden fluid, is pumped at high-pressure downhole into a wellbore. In this example, the frac system 100 introduces the particle laden fluid into a portion of a subterranean hydrocarbon formation at a sufficient pressure and velocity to cut a casing, create perforation tunnels, and/or form and extend fractures within the subterranean hydrocarbon formation. A proppant, such as grains of sand, is mixed with the wellbore servicing fluid to keep the fractures open so that hydrocarbons may be produced from the subterranean hydrocarbon formation and flow into the wellbore. This hydraulic fracturing creates high-conductivity fluid communication between the wellbore and the subterranean hydrocarbon formation.

As illustrated, a clean fluid 102 derived from a source 101 (e.g., storage tank) may be fed to a booster pump 104. Prior to entering the booster pump 104, the clean fluid 102 may pass through one or more filters 106. The clean fluid 102 may be a substantially proppant free fluid and may include potable water, non-potable water, untreated water, treated water, a hydrocarbon-based fluid or other fluids. The filter 106 may be any filter suitable for removing undesirable substances from the clean fluid 102 to maintain a desirable performance of the frac system 100. The booster pump 104 may be used to increase the pressure of the clean fluid 102 to an intermediate pressure before providing the clean fluid 102 to a high-pressure pump 108. The high-pressure pump 108 may increase the pressure of the clean fluid 102 from the intermediate pressure to around 5,000 kPa to 25,000 kPa, 20,000 kPa to 50,000 kPa, 40,000 kPa to 75,000 kPa, 75,000 kPa to 100,000 kPa or greater. The high-pressure clean fluid 102 is then provided to a high-pressure (HP) inlet 113 of a hydraulic energy transfer system 110. For example, the hydraulic energy transfer system may be a pressure exchanger.

The frac system 100 also includes a blender 116 for mixing fluid additives 112 and proppant 114 (each obtained from respective sources 103, 105) to achieve a well-blended proppant slurry 121. The mixing conditions of the blender 116, including time period, agitation method, pressure, and temperature of the blender 116, may be chosen by one of ordinary skill in the art with the aid of this disclosure to produce a homogeneous blend having a desirable composition, density, and viscosity. In alternative examples, however, sand (or another proppant), water, and additives may be premixed and/or stored in a storage tank for use in the frac system 100. The proppant slurry 121 is supplied to a booster pump 118 for increasing the pressure of the proppant slurry 121 to an intermediate pressure before providing the proppant slurry 121 to the hydraulic energy transfer system 110 via a low-pressure (LP) inlet 117. Accordingly, the clean fluid 102 and the proppant slurry 121 including the fluid additives 112 and the proppant 114 are provided to the hydraulic energy transfer system 110 via two separate flow paths, and the clean fluid 102 and the proppant slurry 121 do not mix prior to being fed to the hydraulic energy transfer system 110.

The hydraulic energy transfer system 110 is configured to transfer pressure and/or work between the high-pressure clean fluid 102 and the low-pressure proppant slurry 121. In one application, the hydraulic energy transfer system 110 operates in a balanced mode of operation, wherein the flow rates of the high-pressure clean fluid 102 and the low-pressure proppant slurry 121 input to the hydraulic energy transfer system 110 are substantially the same. According to embodiments of the present disclosure, however, and as will be described in greater detail below, the hydraulic energy transfer system 110 may alternatively operate in an imbalanced mode of operation, wherein the flow rates of the high-pressure clean fluid 102 and the low-pressure proppant slurry 121 input to the hydraulic energy transfer system 110 are different.

Briefly, and as described in further detail below, during operation in the balanced mode, the clean fluid 102 transfers a portion of its pressure to the proppant slurry 121 and exits the hydraulic energy transfer system 110 at a reduced pressure via a low-pressure outlet 115. As a result, the proppant slurry 121 exits the hydraulic energy transfer system 110 at an increased pressure via a high-pressure outlet 119. The high-pressure proppant slurry 121 is injected into one or more subterranean formations (not illustrated) via a wellhead installation 140 for performing fracturing operations.

The hydraulic energy transfer system 110 may be operated using a motor 134 (e.g., electric motor, combustion motor, hydraulic motor, pneumatic motor, a combination thereof, and/or other type of rotary drive). In operation, the motor 134 enables the hydraulic energy transfer system 110 to rotate with highly viscous fluids containing solid particles, powders, debris, etc. For example, the motor 134 may facilitate startup with highly viscous or particulate laden fluids, which enables a rapid start of the hydraulic energy transfer system 110. The motor 134 may also provide additional force that enables the hydraulic energy transfer system 110 to grind through particulate to maintain a proper operating speed (e.g., rpm) with a highly viscous/particulate laden fluid. In any example, the motor 134 may help reduce or prevent mixing between fluids in the hydraulic energy transfer system 110 by controlling an operating speed.

A pre-determined amount of the low-pressure clean fluid 102 may be returned to the blender 116 via a flow path 131 to be mixed with the proppant slurry 121. The low-pressure clean fluid 102 may be contaminated with an unknown amount of proppant slurry 121 due to contact with the proppant slurry 121 in the hydraulic energy transfer system 110. In order to maintain the concentration of the proppant slurry 121 in the blender at a known level, the contaminated low-pressure clean fluid 102 may be provided to a filtration or separation system 130 that removes any residual proppant slurry 121 before the clean fluid 102 is injected into the blender 116. For example, the filtration or separation system 130 may include one or more different types of filters, including cartridge filters, slow sand filters, rapid sand filters, pressure filters, bag filters, membrane filters, granular micro media filters, backwashable strainers, backwashable sand filters, hydrocyclones, and so forth. The remaining low-pressure clean fluid 102 may be returned to the source 101 via flow path 132 for recirculation.

In order to control the composition (e.g., the percentages of fluid additives 112, clean fluid 102, and proppant 114), pressure, and flow of the clean fluid 102 and proppant slurry 121, the frac system 100 may include a controller 133. For example, the controller 133 may maintain flow, composition, and pressure of the clean fluid 102 and the proppant slurry 121 within threshold ranges, above a threshold level, and/or below a threshold level. The controller 133 may include one or more processors 135 and one or more memory devices 137 (one of each shown) storing computer readable program code for controlling the operation of the various components of the frac system 100. The memory device 137 may include a non-transitory medium such as random access memory (RAM) devices, read only memory (ROM) devices, and the like. The controller 133 may also be communicably coupled to one or more external non-volatile memory devices (not shown) such as optical storage devices (e.g., CD or DVD), semiconductor memory devices (e.g., EPROM, EEPROM, flash memory devices), magnetic disks (e.g., internal hard disks, removable disks, and others), and the like. The controller 133 may be communicably coupled to input/output devices 129 such as, keyboard, printer, display devices, pointing devices (e.g., a mouse, a trackball, a tablet, a touch sensitive screen, etc.), mobile computing devices, mobile communication devices, and the like, to exchange data and provide interaction with a user.

The controller 133 may receive feedback from a sensor 139 in the blender 116 regarding the chemical composition of the proppant slurry 121. Based on the feedback received, the controller 133 may open or close valves 143 and/or 145 to adjust the amount of fluid additives 112 and/or proppant 114 entering the blender 116. The controller 133 may also monitor the level of the proppant slurry 121 in the blender 116 with a level sensor 141. If the level of the proppant slurry 121 in the blender 116 is incorrect, the controller 133 may open and close valves 143 and/or 145 to increase or decrease the flow of fluid additives 112 and/or proppant 114 into the blender 116.

In other examples, the controller 133 may receive a signal from a flow meter 147 regarding the flow rate of the clean fluid 102 flowing into the booster pump 104. The controller 133 may then increase or decrease the speed of the booster pump 104 to change the flow rate of the clean fluid 102 into the hydraulic energy transfer system 110. Another flow meter 149 may monitor the flow rate of the proppant slurry 121 and provide a signal to the controller 133 indicating the flow rate. If the flow rate of the proppant slurry 121 is incorrect (or undesirable), the controller 133 may increase or decrease the speed of the booster pump 118 to change the flow rate of the proppant slurry 121 into the hydraulic energy transfer system 110. The controller 133 may also be communicably coupled to the drive 134 for controlling the operation of the hydraulic energy transfer system 110 using the drive 134. For instance, and as described in detail below, the controller 133 may control the drive 134 to adjust an amount of clean fluid 102 and proppant slurry 121 exiting the hydraulic energy transfer system 110.

The hydraulic energy transfer system 110 may be made from materials resistant to corrosive and abrasive substances in the clean fluid 102 and/or the proppant slurry 121. For example, the hydraulic energy transfer system 110 may be made out of ceramics (e.g., alumina, cermets, such as carbide, oxide, nitride, or boride hard phases) within a metal matrix (e.g., Co, Cr or Ni or any combination thereof) such as tungsten carbide in a matrix of CoCr, Ni, NiCr or Co.

Figure 2:
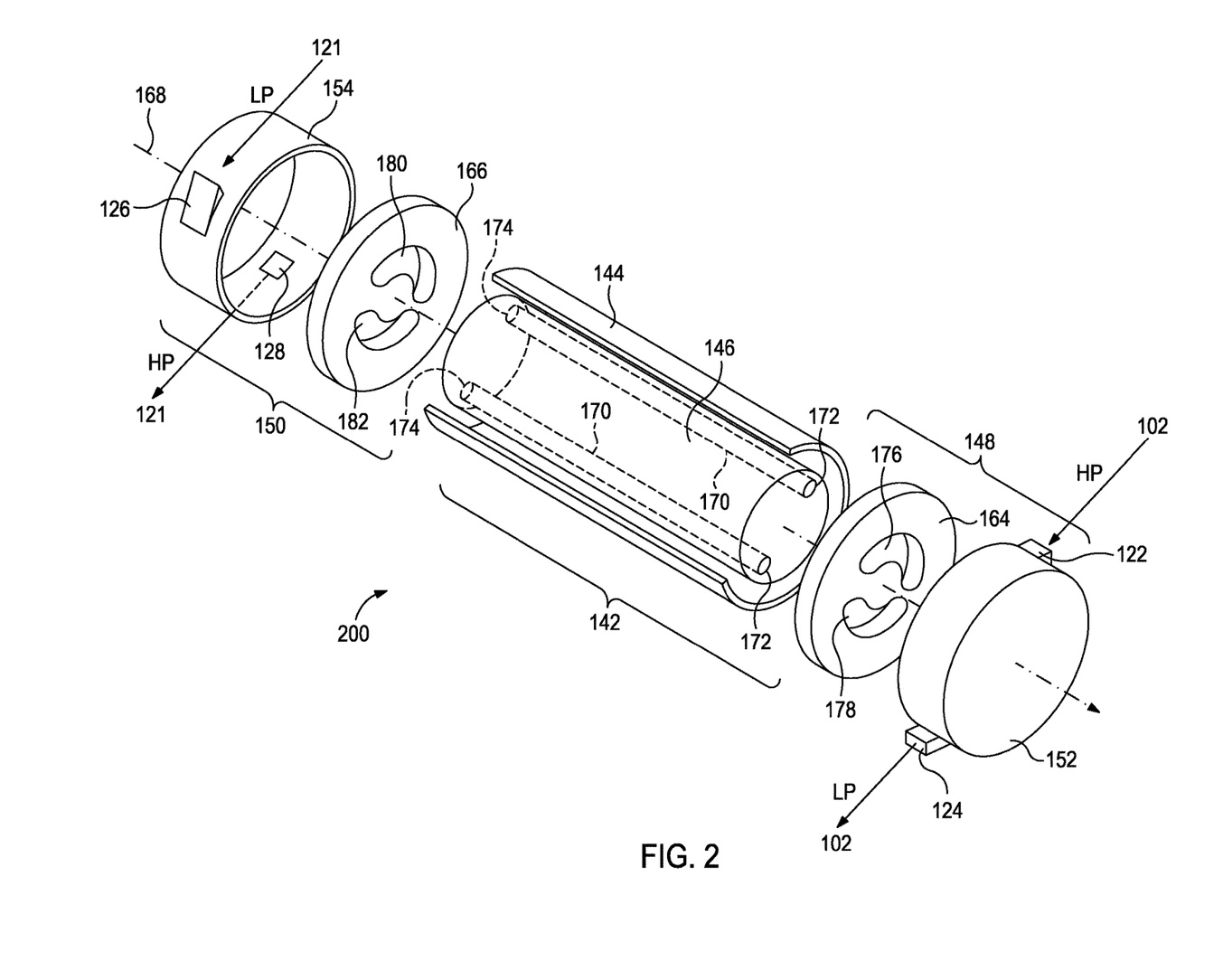
FIG. 2 is an exploded perspective view of an exemplary rotary isobaric pressure exchanger (rotary IPX).

FIG. 2 is an exploded perspective view of an example hydraulic energy transfer system 200. The hydraulic energy transfer system 200 may be used as the hydraulic energy transfer system 110 in the frac system 100 (FIG. 1). In the illustrated embodiment, the hydraulic energy transfer system 200 comprises a rotary isobaric pressure exchanger (rotary IPX). Accordingly, the hydraulic energy transfer system 200 will be referred to herein as "the rotary IPX 200." Rotary isobaric pressure exchangers, such as the rotary IPX 200, may be generally defined as devices that transfer fluid pressure between a low-pressure inlet stream and a high-pressure inlet stream at efficiencies in excess of approximately 90%. Although examples disclosed herein are described in terms of the rotary IPX 200, other kinds of pressure exchangers such as, but not limited to, a reciprocating isobaric pressure exchanger, a reciprocating pressure intensifier, and a rotary axial piston pressure exchanger may also be used herein, without departing from the scope of the disclosure.

The rotary IPX 200 is configured to transfer pressure and/or work between the clean fluid 102 (FIG. 1) and the proppant slurry 121 (FIG. 1), including the fluid additives 112 (FIG. 1) and proppant 114 (FIG. 1), with minimal mixing of the clean fluid 102 and the proppant slurry 121. The rotary IPX 200 may include a generally cylindrical body portion 142 that includes a sleeve 144 (e.g., a rotor sleeve) and a rotor 146. The rotary IPX 200 may also include two end caps 148 and 150 that include manifolds 152 and 154, respectively. The first manifold 152 includes respective inlet and outlet ports 122 and 124, while the second manifold 154 includes respective inlet and outlet ports 126 and 128. In operation, the inlet ports 122, 126 enable the clean fluid 102 and the proppant slurry 121 to enter the rotary IPX 200 to exchange pressure, while the outlet ports 124, 128 enable the clean fluid 102 and the proppant slurry 121 to exit the rotary IPX 200.

In operation, the inlet port 126 may receive the low-pressure (LP) proppant slurry 121 and the inlet port 122 may receive the high-pressure (HP) clean fluid 102. At least a portion of the high pressure of the clean fluid 102 may be imparted to the low pressure of the proppant slurry 121, thereby increasing the pressure of the proppant slurry 121 and decreasing the pressure of the clean fluid 102. The outlet port 124 may be used to route the low-pressure (LP) clean fluid 102 out of the rotary IPX 200 and the outlet port 128 may be used to route the high-pressure (HP) proppant slurry 121 out of the rotary IPX 200. The end caps 148 and 150 include respective end covers 164 and 166 disposed within respective manifolds 152 and 154 that enable fluid sealing contact with the rotor 146. The rotor 146 may be cylindrical and disposed in the sleeve 144, which enables the rotor 146 to rotate about a longitudinal axis 168. The motor 134 (FIG. 1) may be coupled to the rotary IPX 200 to facilitate rotation of the rotor 146. The rotor 146 may have a plurality of channels 170 (two shown in dashed lines) extending substantially longitudinally through the rotor 146 and arranged symmetrically about the longitudinal axis 168 with openings 172 and 174 at opposing ends. The openings 172 of the rotor 146 are arranged for hydraulic communication with inlet and outlet apertures 176 and 178 defined in the first end cover 164, and the openings 174 of the rotor 146 are arranged for hydraulic communication with inlet and outlet apertures 180 and 182 defined in the second end cover 166, in such a manner that during rotation of the rotor 146, the channels 170 are exposed to fluid (clean fluid and slurry) at high-pressure and fluid (clean fluid and slurry) at low-pressure. As illustrated, the inlet and outlet apertures 176, 178, and 180, 182 may be designed in the form of arcs or segments of a circle (e.g., C-shaped).

FIGS. 3-6 are progressive views of the rotary IPX 200 during example operation and illustrating the sequence of positions of a single channel 170 as the rotor 146 rotates through a complete cycle during a balanced mode of operation of the rotary IPX 200. It is noted that FIGS. 3-6 are simplifications of the rotary IPX 200 showing one channel 170, and the channel 170 is shown as having a circular cross-sectional shape. In any example, the rotary IPX 200 may include a plurality of channels 170 with the same or different cross-sectional shapes (e.g., circular, oval, square, rectangular, polygonal, etc.). Thus, FIGS. 3-6 are simplifications for purposes of illustration, and other examples of the rotary IPX 200 may have configurations different from that shown in FIGS. 3-6. As described in detail below, the rotary IPX 200 facilitates pressure exchange between the clean fluid 102 (FIG. 1) and the proppant slurry 121 by enabling the clean fluid 102 and the proppant slurry 121 to briefly contact each other within the rotor 146. As mentioned above, this exchange happens at speeds that result in limited mixing (intermingling) of the clean fluid 102 and the proppant slurry 121.

Figure 3:
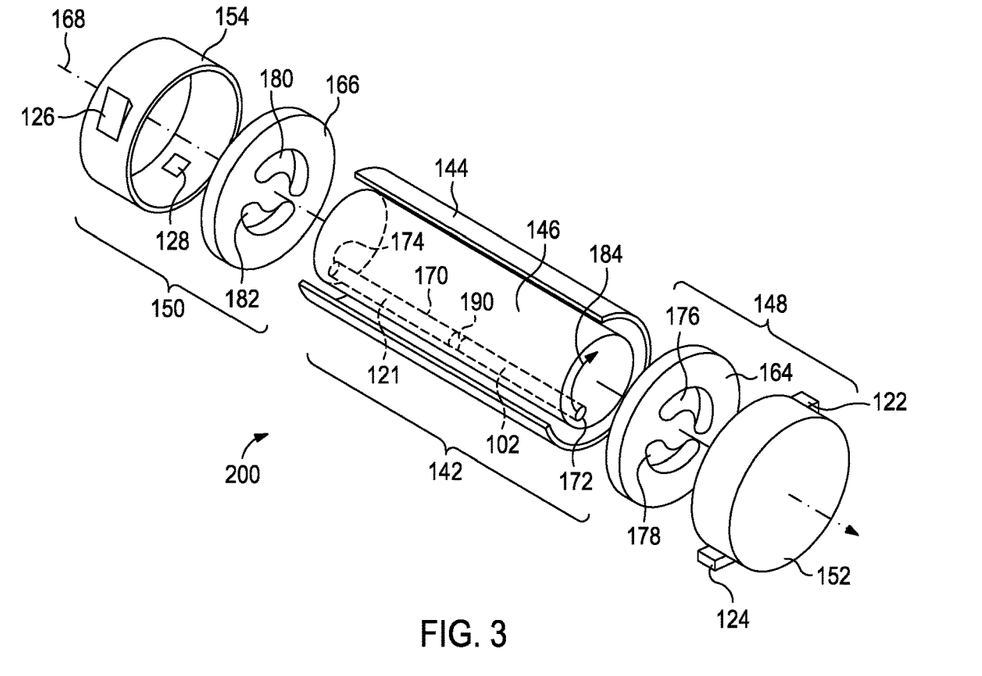
FIG. 3 is an exploded perspective view of the rotary IPX of FIG. 2 in a first operating position.

In FIG. 3, the opening 172 is shown in a first position. In the first position, the opening 172 is in fluid communication with the aperture 178 in end cover 164 and therefore with the manifold 152, while the opposing opening 174 is in hydraulic communication with the aperture 182 in the end cover 166 and, by extension, with the manifold 154. The rotor 146 may rotate in the clockwise direction, as indicated by arrow 184. In operation, low-pressure proppant slurry 121 in the channel 170, passes through the end cover 166 and enters the channel 170, where it contacts the clean fluid 102 also in the channel 170. A dynamic (or movable) fluid interface 190 is generated between the low-pressure proppant slurry 121 and the clean fluid 102 within the channel 170. The proppant slurry 121 then drives the clean fluid 102 out of the channel 170, through the end cover 164, and out of the rotary IPX 200.

Figure 4:
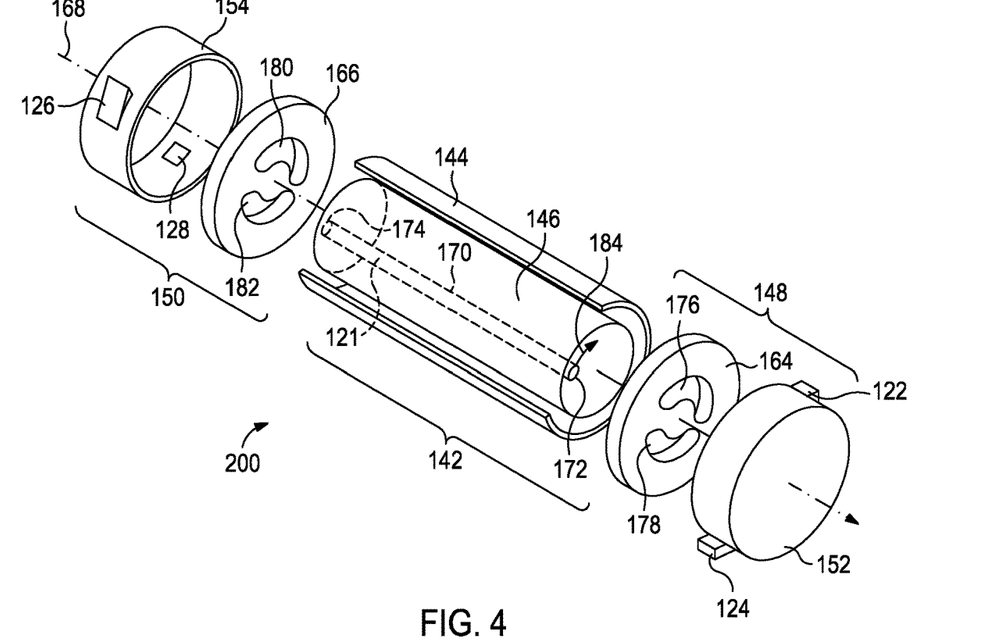
FIG. 4 is an exploded perspective view of the rotary IPX of FIG. 2 in a second operating position.

In FIG. 4, the channel 170 has rotated clockwise through an arc of approximately 90 degrees. In this position, the opening 174 is no longer in fluid communication with the apertures 180 and 182 of the end cover 166, and the opening 172 is no longer in fluid communication with the apertures 176 and 178 of the end cover 164. Accordingly, the low-pressure proppant slurry 121 is temporarily contained within the channel 170.

Figure 5:
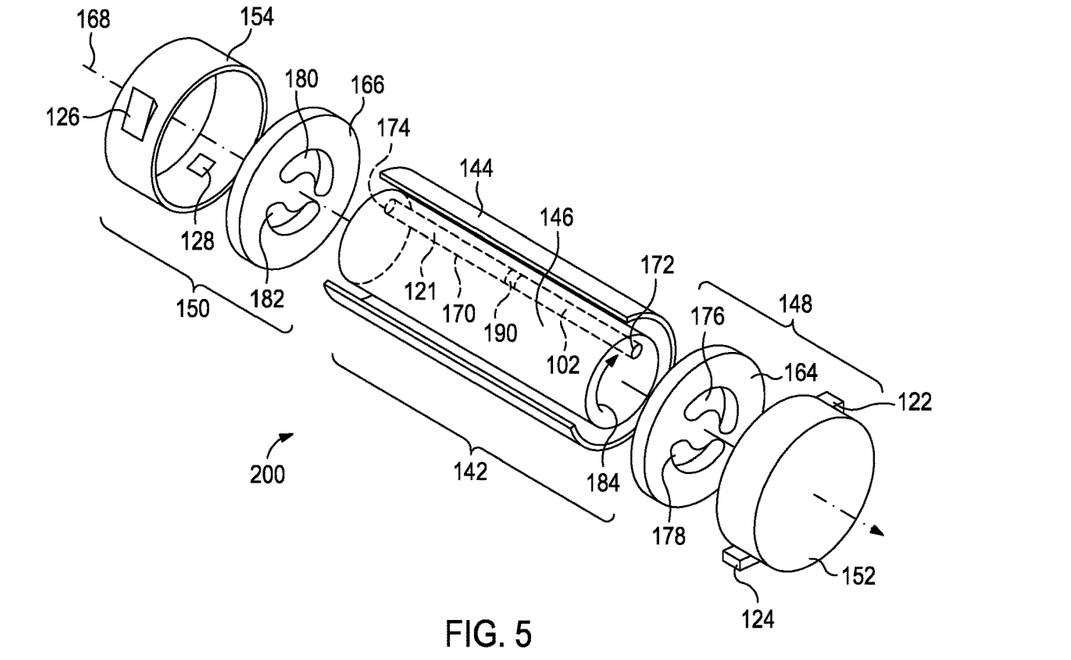
FIG. 5 is an exploded perspective view of the rotary IPX of FIG. 2 in a third operating position.

In FIG. 5, the channel 170 has rotated through approximately 180 degrees of arc from the first position of FIG. 3. The opening 174 is now in fluid communication with aperture 180 in end cover 166, and the opening 172 of the channel 170 is now in fluid communication with aperture 176 of the end cover 164. In this position, high-pressure clean fluid 102 is able to enter the channel 170 and the dynamic fluid interface 190 is again generated between the low-pressure proppant slurry 121 and the clean fluid 102. The high-pressure clean fluid 102 operates to pressurize the low-pressure proppant slurry 121 and thereby drive the proppant slurry 121 out of the channel 170 and through the aperture 180 for use in the frac system 100 (FIG. 1).

Figure 6:
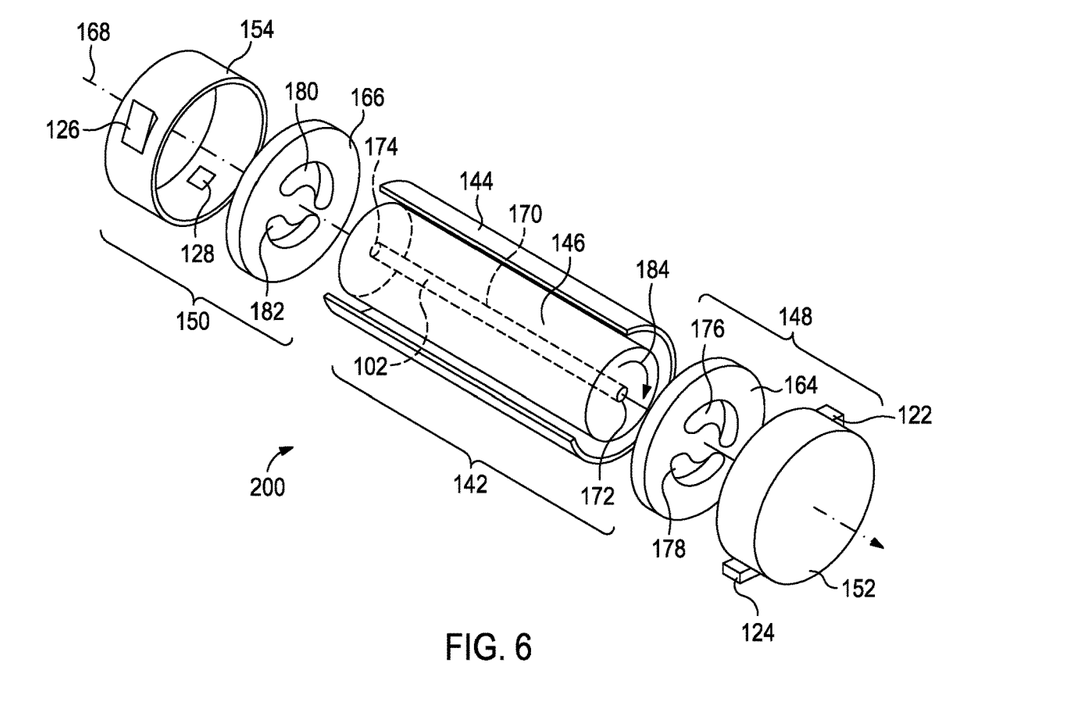
FIG. 6 is an exploded perspective view of the rotary IPX of FIG. 2 in a fourth operating position.

In FIG. 6, the channel 170 has rotated through approximately 270 degrees of arc from the first position of FIG. 3. In this position, the opening 174 is no longer in fluid communication with the apertures 180 and 182 of end cover 166, and the opening 172 is no longer in fluid communication with the apertures 176 and 178 of end cover 164. Accordingly, the clean fluid 102 is no longer pressurized and is temporarily contained within the channel 170 until the rotor 146 rotates another 90 degrees, starting the cycle over again.

In the above-described balanced mode of operation, the clean fluid 102 does not exit the rotary IPX 200 along with the pressurized slurry 121. Specifically, as described with reference to FIG. 5, the rotational speed of the rotor 146 is controlled and otherwise optimized such that, after the pressurized slurry 121 has been driven out of the channel 170, the channel 170 has rotated sufficiently to occlude the opening 174 against the cover 166. Upon being occluded, the opening 174 is no longer in fluid communication with the apertures 180 and 182 of end cover 166 and the clean fluid 102 is thereby prevented from exiting.

On the contrary, in an imbalanced mode of operation of the rotary IPX 200, the flow rate of the clean fluid 102 entering the rotary IPX 200 is greater than the flow rate of the proppant slurry 121 entering the rotary IPX 200. The rotational speed of the rotary IPX 200 is also controlled and otherwise optimized such that a desired amount of the clean fluid 102 is output from the rotary IPX 200 along with all the pressurized proppant slurry 121 before the channel 170 has rotated sufficiently to occlude the opening 174 against the cover 166. In any example, the rotational speed of the rotary IPX 200 may be controlled using the motor 134 (FIG. 1) to adjust the amount of the clean fluid 102 output from the rotary IX 200. The rotational speed of the rotary IPX 200 is also based on the velocity of the fluids (clean fluid 102 and the proppant slurry 121) entering the rotor 146 (FIG. 1) and the flow angle of the fluids. The fluid velocity is determined by the flow rate of the fluids and the cross-sectional area of the fluid flow paths. The design of the end covers 164, 166 and the inlet and outlet apertures 176, 178, 180, and 182 therein determine the flow angle of the fluids entering the channels 170.

As a result, in the imbalanced mode of operation, the rotary IPX 200 cyclically outputs all the pressurized proppant slurry 121 and a portion of the clean fluid 102. The fracturing fluid exiting the rotary IPX 200 thus includes "pulses" or "plugs" of pressurized slurry 121 separated by clean fluid 102, and can be referred to as exhibiting a step-change in proppant concentration. The fracturing fluid is then provided to the wellhead installation 140 (FIG. 1) to be injected into one or more subterranean formations (not illustrated).

Figure 7:
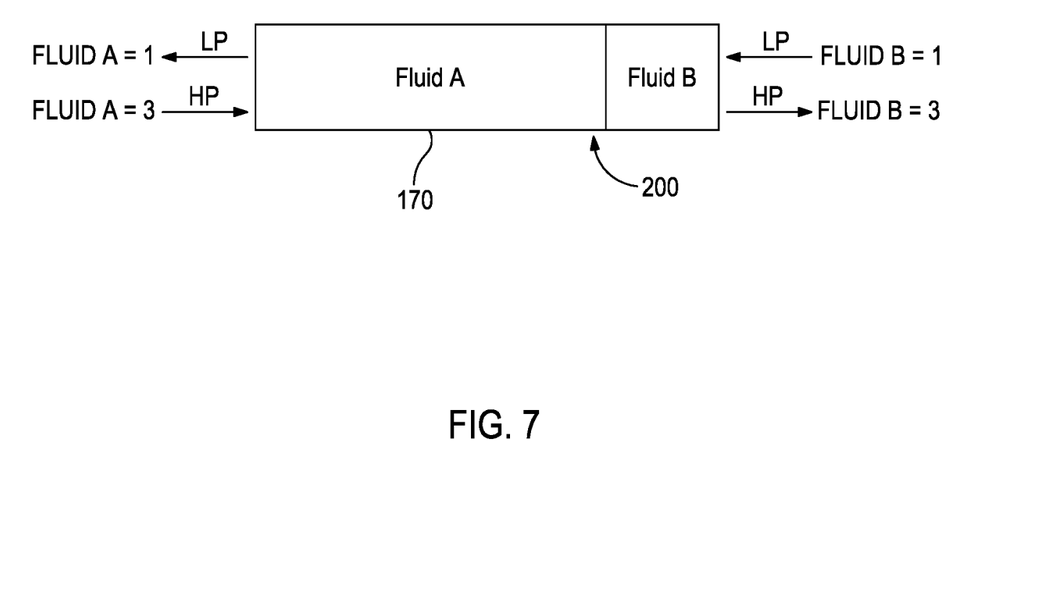
FIG. 7 schematically illustrates fluid flow in the rotary IPX of FIG. 2 during an imbalanced mode of operation.

FIG. 7 schematically illustrates the imbalanced mode of operation of the rotary IPX 200 due to difference in flow rates of the clean fluid 102 and the proppant slurry 121 input to the rotary IPX 200 (FIGS. 2-6). As a non-limiting example and for the purposes of explanation, it is assumed that the high-pressure (HP) clean fluid 102 (represented as Fluid A) input to the rotary IPX 200 has a flow rate of about 3 cubic units per minute and low-pressure (LP) proppant slurry (represented as Fluid B) input to the rotary IPX 200 has a flow rate of about 1 cubic units per minute. Due to the flow rate difference, at each rotational cycle, all of Fluid B in the channel 170 (FIGS. 3-6) may be discharged followed by, approximately, an additional 2 cubic units of Fluid A. Thus, the Fluid B having a flow rate of about 3 cubic units per minute and Fluid A having a flow rate of about 1 cubic units per minute is output from the rotary IPX 200.

Figure 8:
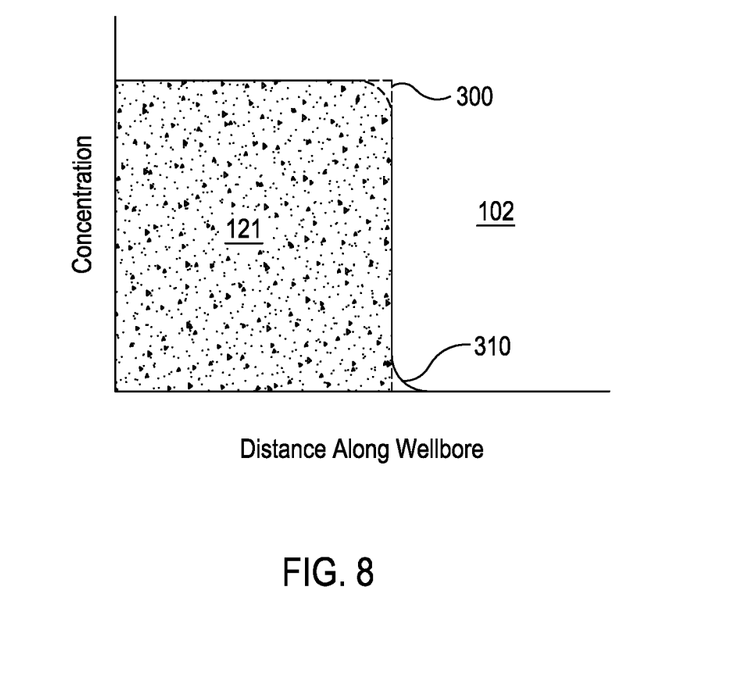
FIG. 8 is a plot of the variation in the concentration of the pressurized slurry output from the rotary IPX of FIG. 2.

FIG. 8 is a plot of the variation in the concentration of the pressurized slurry 121 as observed at the output of the rotary IPX 200. As illustrated, the variation of the concentration of the pressurized slurry 121 is a square-wave step-change from the clean fluid 102, with non-square transition 310 at the "corners" of the step change profile 300.

It will thus be understood that, in the imbalanced mode of operation, a reduced amount of low-pressure clean fluid 102 exits the rotary IPX 200 from the outlet port 124. As a result, it may not be required to return the low-pressure clean fluid 102 to the source 101 (FIG. 1). In addition, because mixing of the clean fluid 102 and the proppant slurry 121 in the rotary IPX 200 is significantly reduced, it may not be required to filter the low-pressure clean fluid 102 before reinjecting into the blender 116. As a result, the filtration or separation system 130 (FIG. 1) may be omitted from the frac system 100 (FIG. 1), in at least one embodiment.

Figure 9:
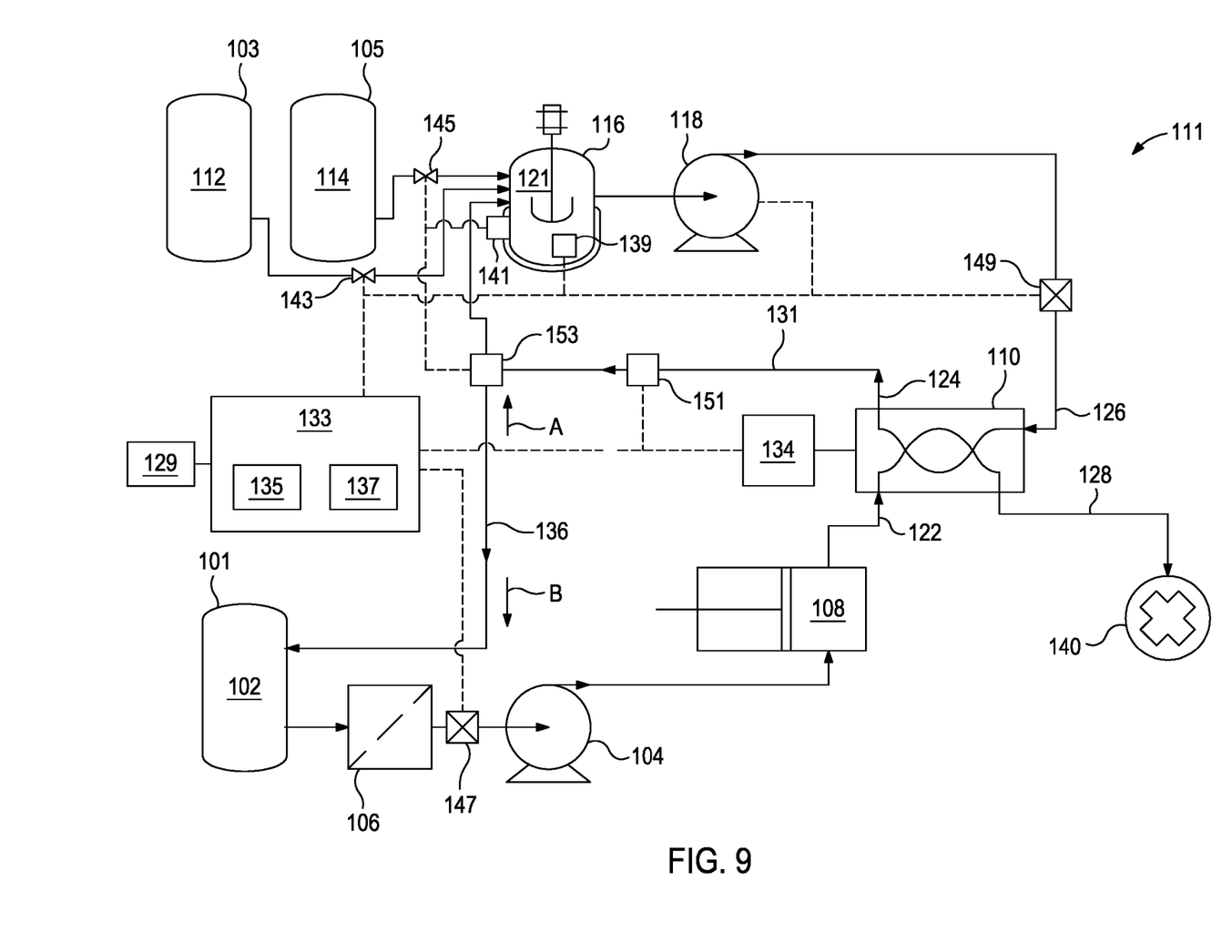
FIG. 9 illustrates a schematic diagram of a modified fracturing fluid handling system including a hydraulic energy transfer system operating in an imbalanced mode of operation.

FIG. 9 illustrates a schematic diagram of a modified frac system 111. The frac system 111 may be similar in some respects to the frac system 100 in FIG. 1, and therefore may be best understood with reference thereto where like numerals designate like components not described again in detail. Unlike the frac system 100, the filtration or separation system 130 (FIG. 1) and the return flow path 132 (FIG. 1) are absent in the frac system 111 of FIG. 9. The hydraulic energy transfer system 110 in FIG. 9 may be or include the rotary IPX 200 of FIG. 2 that operates in the imbalanced mode of operation described above. As a result, fracturing fluid including a step-change in proppant concentration may be output from the hydraulic energy transfer system 110 in FIG. 9.

To facilitate rotation, a lubrication system (not expressly illustrated) may be used to pump lubricating fluid into the hydraulic energy transfer system 110. The lubrication system either may be included in the hydraulic energy transfer system 110 or may be a separate "stand-alone" system and may provide active lubrication, wherein the lubricating fluid is continuously circulated in the hydraulic energy transfer system 110 during operation. In any example, the clean fluid 102 may be used as lubricating fluid. Optionally, the clean fluid 102 may be treated (e.g., for modifying its viscosity, chemical composition, etc.) for use as lubricating fluid.

Due to pressure differences between HP clean fluid 102 (used for lubrication) and the low pressure fluids (clean fluid 102 and proppant slurry 121), some of the HP clean fluid 102 will leak into the channels 170 when the LP proppant slurry 121 is entering the rotary IPX 200 and when the LP clean fluid 102 is being discharged from the rotary IPX 200. This will cause minor volume changes in the LP clean fluid 102 discharged from the rotary IPX 200 and the HP proppant slurry 121 discharged from the rotary IPX 200. Specifically, the HP proppant slurry 121 discharged from the rotary IPX 200 may be diluted due to addition of the clean fluid 102 (used as lubricant). The volume of LP clean fluid 102 discharged from the rotary IPX 200 may increase or decrease, depending on the flow network dynamics. In order to compensate for the potential increase or decrease in LP clean fluid 102 discharged from the rotary IPX 200, additional clean fluid 102 may be provided to the blender 116 (in case of decrease of LP clean fluid 102) or excess clean fluid 102 may be diverted away from the blender 116 (in case of increase of LP clean fluid 102).

Specifically, in case of decrease of LP clean fluid 102, additional clean fluid 102 may be drawn from the source 101 and provided to the blender 116 via the flow path 136, as indicated by arrow A. In case of increase of LP clean fluid 102, the excess clean fluid 102 may be returned to the source 101 via flow path 136, as indicated by arrow B. A flow meter 151 may provide a signal to the controller 133 regarding the flow rate of the LP clean fluid 102 discharged from the rotary IPX 200. Depending on the flow rate, the controller may open or close a flow control valve 153 to provide additional clean fluid 102 to the blender 116 or to divert excess clean fluid 102 to the source 101.

Embodiments disclosed herein include:

A. A method that includes introducing a first fluid at a first flow rate into a first end of a channel of a hydraulic energy transfer system, introducing a second fluid at a second flow rate into a second end of the channel opposite the first end, wherein the first flow rate is lower than the second flow rate, and operating the hydraulic energy transfer system to output a third fluid comprising the first fluid and a portion of the second fluid and exhibiting a step-change in concentration of the first fluid.

B. A system that includes a first fluid, a second fluid, and a hydraulic energy transfer system that receives the first fluid at a first flow rate into a first end of a channel of the hydraulic energy transfer system and further receives the second fluid at a second flow rate higher than the first flow rate and into a second end of the channel opposite the first end, wherein the hydraulic energy transfer system outputs a third fluid comprising the first fluid and a portion of the second fluid and exhibiting a step-change in concentration of the first fluid.

C. A method that includes introducing a first fluid at a first flow rate into a first end of a channel of a rotary isobaric pressure exchanger and a second fluid at a second flow rate into a second end of the channel opposite the first end, wherein the second flow rate is higher than the first flow rate, and controlling a rotational speed of a rotor of the rotary isobaric pressure exchanger to generate a step-change in concentration of the first fluid in a third fluid output from the rotary isobaric pressure exchanger.

Each of embodiments A, B, and C may have one or more of the following additional elements in any combination:

Element 1: wherein the first fluid is introduced at a first pressure and the second fluid is introduced at a second pressure higher than the first pressure, and wherein introducing the second fluid into the second end of the channel comprises imparting a portion of the second pressure to the first pressure. Element 2: wherein the first fluid is a proppant slurry, the second fluid is a clean fluid, and the third fluid is a fracturing fluid exhibiting the step-change in proppant concentration. Element 3: further comprising hydraulically fracturing a subterranean formation using the fracturing fluid. Element 4: wherein the hydraulic energy transfer system includes a rotary isobaric pressure exchanger, and operating the hydraulic energy transfer system comprises controlling a rotational speed of a rotor of the rotary isobaric pressure exchanger to output the third fluid. Element 5: wherein controlling the rotational speed of the rotor comprises controlling the rotational speed using a motor coupled to the rotary isobaric pressure exchanger. Element 6: wherein operating the hydraulic energy transfer system includes cyclically outputting the first fluid and the portion of the second fluid.

Element 7: wherein the hydraulic energy transfer system receives the first fluid at a first pressure and the second fluid at a second pressure higher than the first pressure, and wherein a portion of the second pressure is imparted to the first pressure using the hydraulic energy transfer system. Element 8: wherein the first fluid is a proppant slurry, the second fluid is a clean fluid, and the third fluid is a fracturing fluid exhibiting the step-change in proppant concentration. Element 9: wherein the hydraulic energy transfer system is fluidly coupled to a wellhead installation to deliver the fracturing fluid to a subterranean formation. Element 10: wherein the hydraulic energy transfer system comprises a rotary isobaric pressure exchanger having a rotor, the system further comprising a motor operably coupled to the rotor to control a rotational speed of the rotor to output the third fluid. Element 11: wherein the motor is selected from the group consisting of an electric motor, a hydraulic motor, a pneumatic motor, a combustion motor, and any combination thereof. Element 12: wherein the hydraulic energy transfer system cyclically outputs the first fluid and the portion of the second fluid.

Element 13: wherein introducing the first fluid and the second fluid includes introducing the first fluid having a first pressure and the second fluid having a second pressure higher than the first pressure. Element 14: further comprising imparting at least a portion of the second pressure to the first pressure using the rotary isobaric pressure exchanger. Element 15: wherein the first fluid is a proppant slurry, the second fluid is a clean fluid, and the third fluid is a fracturing fluid exhibiting the step-change in proppant concentration. Element 16: wherein controlling the rotational speed of the rotor of the rotary isobaric pressure exchanger includes controlling the rotational speed using a motor operably coupled to the rotor.

By way of non-limiting example, exemplary combinations applicable to A, B, C include: Element 1 and Element 2; Element 2 and Element 3; Element 4 and Element 5; Element 7 and Element 8; Element 8 and Element 9; Element 10 and Element 11; Element 13 and Element 14; and Element 14 and Element 15.

Therefore, the disclosed systems and methods are well adapted to attain the ends and advantages mentioned as well as those that are inherent therein. The examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the illustrative examples disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
introducing a first fluid at a first flow rate into a first end of a channel of a hydraulic energy transfer system;
introducing a second fluid at a second flow rate into a second end of the channel opposite the first end, wherein the first flow rate is lower than the second flow rate; and
operating the hydraulic energy transfer system to output a third fluid comprising all of the first fluid and at least a portion of the second fluid and exhibiting a step-change in concentration of the first fluid; wherein the first fluid is a proppant slurry, the second fluid is a clean fluid, and the third fluid is a fracturing fluid exhibiting the step-change in proppant concentration; wherein the hydraulic energy transfer system includes a rotary isobaric pressure exchanger comprising a rotor that rotates to open and close the channel disposed therein, and operating the hydraulic energy transfer system comprises controlling a rotational speed of the rotor of the rotary isobaric pressure exchanger to output the third fluid by introducing the first fluid and the second fluid to the channel when the rotor has rotated to open the channel, pressurizing the first fluid through contact with the second fluid, and outputting all of the pressurized first fluid with the portion of the second fluid from the opened channel before the rotation of the rotor closes the channel.

2. The method of claim 1, wherein the first fluid is introduced at a first pressure and the second fluid is introduced at a second pressure higher than the first pressure, and wherein introducing the second fluid into the second end of the channel comprises imparting a portion of the second pressure to the first pressure.

3. The method of claim 2, further comprising hydraulically fracturing a subterranean formation using the fracturing fluid.

4. The method of claim 1, wherein controlling the rotational speed of the rotor comprises controlling the rotational speed using a motor coupled to the rotary isobaric pressure exchanger.

5. The method of claim 1, wherein operating the hydraulic energy transfer system includes cyclically outputting the first fluid and the portion of the second fluid.

6. A system, comprising:
a first fluid;
a second fluid; and
a hydraulic energy transfer system that receives the first fluid at a first flow rate into a first end of a channel of the hydraulic energy transfer system and further receives the second fluid at a second flow rate higher than the first flow rate and into a second end of the channel opposite the first end, wherein the hydraulic energy transfer system outputs a third fluid comprising all of the first fluid and at least a portion of the second fluid and exhibiting a step-change in concentration of the first fluid, wherein the first fluid is a proppant slurry, the second fluid is a clean fluid, and the third fluid is a fracturing fluid exhibiting the step-change in proppant concentration; wherein the hydraulic energy transfer system includes a rotary isobaric pressure exchanger comprising a rotor that rotates to open and close the channel disposed therein, wherein the hydraulic energy transfer system is configured to control a rotational speed of the rotor of the rotary isobaric pressure exchanger to output the third fluid by pressurizing the first fluid through contact with the second fluid and outputting all of the pressurized first fluid with the portion of the second fluid from the opened channel before the rotation of the rotor closes the channel.

7. The system of claim 6, wherein the hydraulic energy transfer system receives the first fluid at a first pressure and the second fluid at a second pressure higher than the first pressure, and wherein a portion of the second pressure is imparted to the first pressure using the hydraulic energy transfer system.

8. The system of claim 7, wherein the hydraulic energy transfer system is fluidly coupled to a wellhead installation to deliver the fracturing fluid to a subterranean formation.

9. The system of claim 6, wherein the hydraulic energy transfer system comprises a rotary isobaric pressure exchanger having a rotor, the system further comprising a motor operably coupled to the rotor to control a rotational speed of the rotor to output the third fluid.

10. The system of claim 9, wherein the motor is selected from the group consisting of an electric motor, a hydraulic motor, a pneumatic motor, a combustion motor, and any combination thereof.

11. The system of claim 6, wherein the hydraulic energy transfer system cyclically outputs the first fluid and the portion of the second fluid.

12. A method, comprising:
introducing a first fluid at a first flow rate into a first end of a channel of a rotary isobaric pressure exchanger and a second fluid at a second flow rate into a second end of the channel opposite the first end, wherein the second flow rate is higher than the first flow rate; and
controlling a rotational speed of a rotor of the rotary isobaric pressure exchanger to generate a step-change in concentration of the first fluid in a third fluid output from the rotary isobaric pressure exchanger, wherein the rotor comprises the channel and the rotor is rotated to open and close the channel; wherein the first fluid is a proppant slurry, the second fluid is a clean fluid, and the third fluid is a fracturing fluid exhibiting the step-change in proppant concentration; wherein the controlling the rotational speed of the rotor comprises introducing the first fluid and the second fluid to the channel when the rotor has rotated to open the channel, pressurizing the first fluid through contact with the second fluid, and outputting all of the pressurized first fluid with the portion of the second fluid from the opened channel before the rotation of the rotor closes the channel.

13. The method of claim 12, wherein introducing the first fluid and the second fluid includes introducing the first fluid having a first pressure and the second fluid having a second pressure higher than the first pressure.

14. The method of claim 13, further comprising imparting at least a portion of the second pressure to the first pressure using the rotary isobaric pressure exchanger.

15. The method of claim 12, wherein controlling the rotational speed of the rotor of the rotary isobaric pressure exchanger includes controlling the rotational speed using a motor operably coupled to the rotor.

* * * * *